United States Patent [19]

Guch, Jr. et al.

[11] Patent Number: 5,550,851
[45] Date of Patent: Aug. 27, 1996

[54] LASER SYSTEM DECONTAMINATION METHOD AND APPARATUS

[75] Inventors: Steve Guch, Jr., Longwood; Floyd Hovis, Apopka, both of Fla.

[73] Assignee: Litton Systems, Inc., Woodland Hills, Calif.

[21] Appl. No.: 306,470

[22] Filed: Sep. 15, 1994

[51] Int. Cl.$^6$ ............................................. H01S 3/00
[52] U.S. Cl. .................................... 372/33; 372/59
[58] Field of Search ................................ 372/33, 59

[56] References Cited

U.S. PATENT DOCUMENTS

| | | | |
|---|---|---|---|
| 4,229,709 | 10/1980 | McMahon | 372/59 |
| 4,689,796 | 8/1987 | Wright | 372/59 |

*Primary Examiner*—Rodney B. Bovernick
*Assistant Examiner*—Robert E. Wise
*Attorney, Agent, or Firm*—William M. Hobby, III

[57] ABSTRACT

A decontaminate apparatus for a laser system includes a laser having a compartment housing having a base and walls formed into a cavity and having a compartment cover having at least a portion thereof porous to predetermined gases used in laser system optical cavities. The compartment housing cavity is filled with a selected decontaminating material held therein by the porous cover and is attached in the laser system housing so that selected contamination in the laser system optical compartment gas is absorbed by the selected material in the compartment. The compartment cover can be made of a porous silica. A method of cleaning a laser optical cavity includes forming the housing having the cavity therein, selecting a decontaminate material, placing the selected decontaminate material into the housing, and forming and attaching a cover, at least a portion of which is porous to predetermined gases used in laser optical cavities, and attaching the housing with the selected material in the laser cavity so that selected contamination in the laser system optical cavity gas is absorbed by the selected material.

18 Claims, 1 Drawing Sheet

LASER SYSTEM DECONTAMINATION METHOD AND APPARATUS

BACKGROUND OF THE INVENTION

The present invention relates to a method of cleaning or maintaining the cleanliness of a laser optical compartment and to a decontamination apparatus for a laser system and especially to a laser decontaminate apparatus and method attached within a laser system for absorbing contaminants from gases used in the system.

The fundamental components of a laser are a resonator, a laser medium, an output coupling mechanism, and a laser optical compartment housing the aforementioned components and other auxiliary equipment. A laser resonator basically consists of two resonator reflectors between which light travels back and forth. The region between the two reflectors is termed a "resonator". A laser gain medium within the cavity amplifies the light as it repeatedly traverses the cavity. Laser gain media are typically either solid state (such as Nd:YAG), gas (such as $CO_2$) or liquids (such as dye-bearing solvents). A gas laser has as its lasing medium a gas contained or flowing within the cavity between the cavity reflectors. A solid state laser places a solid crystal rod or the like within the laser cavity between the resonator reflectors. A liquid laser may include a dye/solvent mixture within a cell bounded by glass windows. Laser optical compartments are often closed or sealed to prevent inadvertent personnel access or to exclude contamination or perturbation by external forces. In almost cases, the laser compartment contains either active or passive gases through which the laser beam propagates. As a result of imperfect cleaning, seal leakage or offgasing of structural or optical materials, volatile contaminates are invariably evolved into the gas volume. Because of the high optical powers which exist within the resonator, these contaminants often lead to optical damage of components on which the laser beam impinges.

In the past, various types of materials and cleaning processes have been used to make laser systems in order to prevent or reduce contamination within the gas volume within the lasers but it is still common to simply remove the gases periodically and replace them to thereby remove the contaminants. This is both expensive and inconvenient and is often ineffective in eliminating optical damage when rates of contamination are unknown.

The present invention is directed towards an apparatus and method to remove contaminant vapors from a laser optical compartment to thereby prevent optical damage or loss of efficiency resulting from deposition of solid or liquid films from the gas since many of the materials that could be used for removing contaminants are themselves a contaminant or dirty and cannot be used in a laser optical compartment. The present invention is directed towards an apparatus which allows materials which are required for absorbing certain type of contaminants to be used in a manner that they can absorb the contaminants without contaminating the laser compartment gas volume.

SUMMARY OF THE INVENTION

A decontaminate apparatus for a laser optical compartment includes a housing having a base and walls forming a cavity and having a compartment cover having at least a portion thereof open or porous to predetermined gases used in laser system optical cavities. The housing cavity is filled with a selected decontaminating material held therein by the porous cover and is attached in the laser system housing so that selected contamination in the laser system optical cavity gas is absorbed or adsorbed by the selected material in the compartment. The compartment cover can be made of a porous silica. A method of cleaning or maintaining the cleanliness of a laser optical cavity includes forming the housing having the cavity therein, selecting a decontaminate material, placing the selected decontaminate material into the housing, and selecting and attaching a cover, at least a portion of which is porous to predetermined gases used in laser optical cavities, and attaching the housing with the selected material in the laser optical compartment so that selected contamination in the laser system optical cavity gas is absorbed by the selected material.

BRIEF DESCRIPTION OF THE DRAWINGS

Other objects, features, and advantages of the present invention will be apparent from the written description and the drawings in which.

DETAILED DESCRIPTION OF THE PREFERRED EMBODIMENT

Figure 1:
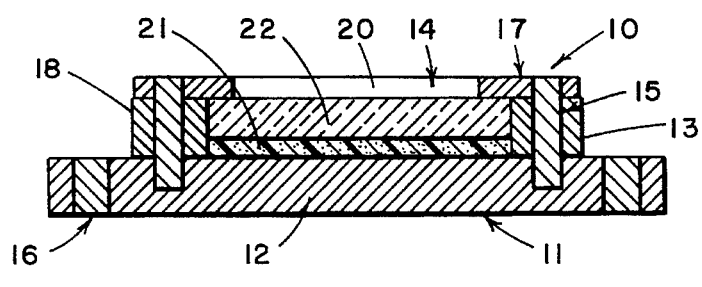
FIG. 1 is a sectional view of a decontaminate apparatus in accordance with the present invention.

Referring to the drawings and especially to FIG. 1, a preferred embodiment of the present invention has a decontaminate apparatus 10 having an aluminum frame 11 including the base component 12 and sidewalls 13 attached thereto to form a cavity 14 thereinside. The walls 13 include screw holes 15 for securing a cover to the body 11 while the base 12 of the housing 11 has holes 16 therethrough for securing the container within a laser optical compartment. A frame top 17 is attached with the threaded fasteners 18 to the walls 13 through the screw holes 15 to the base 12. Top 17 of the container is formed with an open center area 20 and has a cushioning pad 21 placed in the bottom of the container portion 14 and attached to the base 12 of the housing 11. Cushioning member 21 can be of a polyurethane material and has a block 22 of porous silica attached thereto used as a desiccant and as a contaminant absorber. The block 22 is held in place by the frame top 17. The porous silica 22 can be purchased under the tradename VYCOR 7930 and made by Corning Glass Company and is cut to shape to fit within the container. The apparatus 10 is then attached within a laser housing to the walls of the laser cavity through the screw holes 16 and, as the laser gas passes through the cavity and passes the decontaminate apparatus 10, the porous silica 22 will absorb the contaminating gases. Material 22 can be rapidly replaced by removing the screws 18 and the top 17 and simply replacing the material. The cushioning pad 21 cushions the material from breaking or cracking due to vibrations or shock to the laser apparatus. The opening 20 can be covered with a porous TEFLON filtering material to contain other decontaminate materials which, unlike porous silica, may not be in a form suitable for direct exposure to the laser compartment. Examples of such materials are charcoal (which forms black powder) or molecular sieve (which is also powdery).

Figure 2:
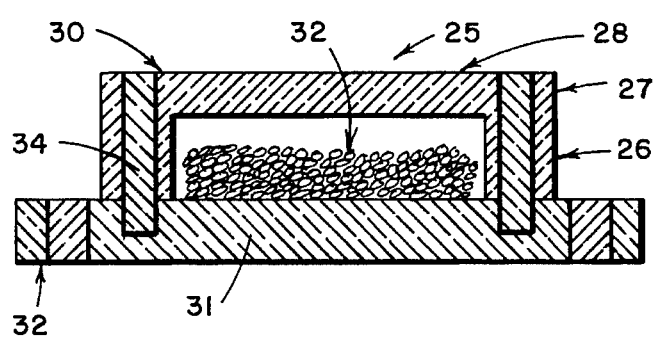
FIG. 2 is a sectional view of an alternate embodiment of a decontaminate apparatus for laser optical compartments.

In the embodiment of FIG. 2, a decontaminate apparatus 25 has a housing 26 having walls 27 which may be made of a porous silica (micro porous glass) or of a plastic or metal material. Micro-porous glass is formed by techniques which include leaching of bulk glass or solid gel processing. The micro-porous glass 27 removes contaminates by diffusion of the vapors into the pores of the medium with adhesion taking place as monolayers of the vaporous material form on the surface of the absorbent material. A cover 28 is also made of the micro-porous glass and has openings 30 passing therethrough and through the walls 27 and into the base 31. Base 31 has a plurality of through holes 32 to secure the container within a laser optical compartment. Thus, the walls 27 and base 31 form a container cavity 32 thereinside which holds a material 33 which is specifically selected for decontaminating certain types of gases passing through the laser cavity. The decontaminate material 33, however, might be a dirty material which can itself contaminate the gases passing through the cavity so that the material 33 cannot escape into the cavity. The use of the micro-porous glass cover 28 allows the gases to pass therethrough with the micro-porous glass 28 removing some of the materials while material 33 is needed to remove additional contaminates. Material 33, for example, might be di-phosphorous pentoxide, which strongly interacts with many materials and captures them as chemical compounds with low vapor pressure. Di-phosphorous pentoxide is particularly effective as a desiccant material since it hydrates strongly to bind vaporous water. In addition, other dirty absorbent materials, such as activated charcoal or molecular sieve, can be placed within the cavity 32 and are prevented from entering the gas. The decontaminate apparatus 25 is a holder to support and attach an absorber or absorbent material within the laser optical cavity to provide a porous means to allow the vapor to reach the absorber 33 but restraining the material 33 from entering into the compartment.

A particular embodiment involves encapsulation of a di-phosphorous pentoxide or activated charcoal within a micro-porous glass container sealed by a non-contaminating epoxy adhesive. However, the activated charcoal absorber could also be enclosed with an aluminum holder sealed from the optical compartment by a porous TEFLON filter which is mechanically sealed by an aluminum frame and a non-contaminating epoxy adhesive or ethylene propylene O-rings. This latter form is particularly advantageous for absorbers which are corrosive or chemically reactive with materials which may reside within the compartment cavity 32 or which may intrinsically generate dust which could physically contaminate the compartment with particles. The cover 25 or the cover for the opening 14 of FIG. 1 could be made of a TEFLON filter material and the pin 34 attached with a non-contaminating epoxy adhesive or attached with threaded fasteners using an ethylene propylene O-ring.

Figure 3:
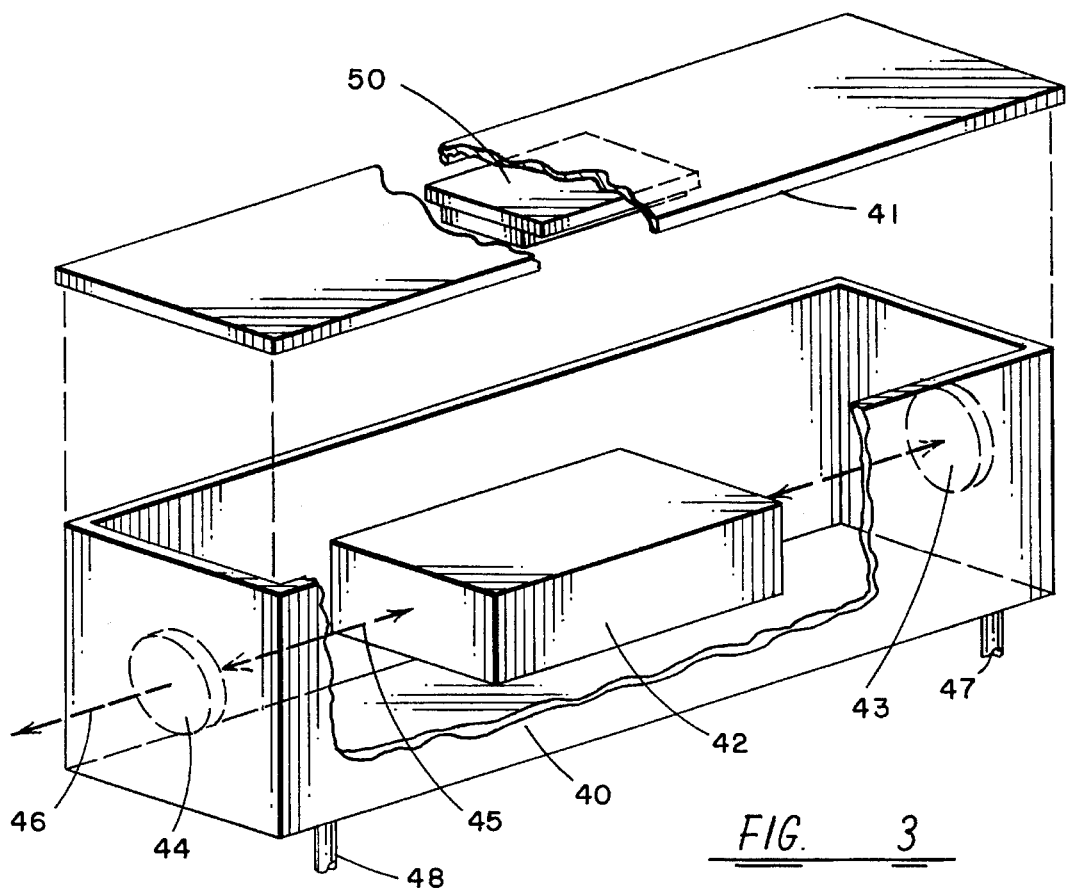
FIG. 3 is an exploded perspective view of a laser optical compartment having the present invention mounted therein.

Referring to FIG. 3, an exploded perspective view with parts cut away of the optical or laser compartment has a normally sealed optical compartment 40 which has a top 41 which is sealed to the compartment to provide the sealed compartment. The laser compartment normally contains the laser gain medium 42 mounted therein with a laser rear reflector 43 and a laser output mirror 44 at the other end of the laser gain medium 42. The laser output mirror can be a partially reflective mirror or it can use other techniques for both reflecting light back into the medium along the beam line 45 while transmitting an output beam 46 through the mirror 44. The laser would, of course, also have pumping means along with a power supply for driving the pumping means, not shown, and can have an inlet tube 47 and an outlet tube 48 for circulation of gas into and out of the laser optical compartment 40. The decontaminating means 50 is shown mounted to the underside of the top for the sealed optical compartment where it can be attached, such as with adhesives or with threaded attaching members extending thereto, and can be either the embodiments shown in FIG. 1 or FIG. 2.

A method of cleaning the gas within a laser optical cavity in accordance with the present invention includes forming the housing 11 (or 25) having a base 12 (or 31) and walls 13 (or 27) to form a cavity 14 (or 32). Then selecting a material, such as a micro-porous glass 22 or a di-phosphorous pentoxide 33 for mounting within the cavity 14 (or 32) and placing the material and attaching the material within the cavity. Cover 17 (or 28), in each case, has at least a portion thereof which is porous to predetermined gases used in a laser optical cavity, such as the use of a micro-porous glass cover or a porous TEFLON filtering material. The cover is attached to the housing over the selected material within the housing cavity and the housing supporting the decontaminating material is mounted within a laser system optical compartment for filtering the gases passing therethrough, such as may be produced by leakage of exterior gases into the optical compartment, by incomplete initial cleaning of the assembly or by the off-gasing from components within the compartment. The method includes the mounting of a cushioning material 21 within the apparatus along with the selection of a di-phosphorous pentoxide or porous silica for attaching within the cavity and the selecting and attaching of a polyurethane cushioning material to the base of the cavity. The method also includes mounting the decontamination means within a sealed optical compartment 40 as shown in FIG. 3 for cleaning or decontaminating the gas in the laser compartment 40.

It should be clear at this time that an apparatus and method for decontaminating laser optical cavities has been provided which allows the cleaning of the gas within the laser optical compartment so as to remove contaminate vapors and prevent optical damage or loss within the laser system from the deposition of solid or liquid films forming from the vapors. However, the present invention should not be considered limited to the forms shown which are to be considered illustrative rather than restrictive.

We claim:

1. A method of cleaning and maintaining the gas within a laser optical compartment comprising the steps of:

forming a housing having a base and walls forming a cavity therein;

selecting a contaminant absorbing material selected to absorb predetermined contaminates from a laser system optical compartment gas;

placing the selected material into said housing cavity;

forming a cover having at least a portion thereof made of porous silica which is porous to predetermined gases in a laser system optical compartment but non-porous to the selected contaminant absorbing material;

attaching said formed cover to said housing over said selected material in the housing cavity; and attaching said housing and selected material therein in a laser system in contact with the gas in the laser system, whereby selected contamination in the laser system optical compartment gas is absorbed or adsorbed by the selected material.

2. A method of cleaning and maintaining the gas within a laser optical compartment clean in accordance with claim 1 including the step of fastening said housing to a laser system a plurality of threaded fasteners.

3. A method of cleaning and maintaining the gas within a laser optical compartment clean in accordance with claim 1 including the step of fastening said housing to a laser system with a plurality of threaded bolts.

4. A method of cleaning and maintaining the gas within a laser optical compartment clean in accordance with claim 1 including the step of mounting a shock absorbing sheet of material within said housing cavity beneath the contaminant absorbing material placed therein to thereby provide cushioning to said selected material.

5. A method of cleaning and maintaining the gas within a laser optical compartment in accordance with claim 4 including the step of mounting a shock absorbing sheet of material made of poron within said housing cavity beneath the contaminant absorbing material placed therein.

6. A method of cleaning and maintaining the gas within a laser optical compartment clean in accordance with claim 1 in which the step of selecting a contaminant absorbing material includes selecting activated charcoal.

7. A method of cleaning and maintaining the gas within a laser optical compartment clean in accordance with claim 1 in which the step of selecting a contaminant absorbing material includes selecting phosphorus pentoxide.

8. A method of cleaning and maintaining the gas within a laser optical compartment clean in accordance with claim 1 in which the step of selecting a contaminant absorbing-material includes selecting porous silica.

9. A method of cleaning and maintaining the gas within a laser optical compartment clean in accordance with claim 1 in which the step of forming a housing includes forming a housing of aluminum alloy.

10. A decontaminate apparatus for laser systems comprising:

a laser system;

a compartment housing having a base and walls forming a cavity therein and a compartment cover having at least a portion thereof made of porous silica, porous to predetermined gases used in laser system optical compartments attached to said compartment housing and having a decontaminating material held in said compartment housing by said compartment cover, said compartment housing being attached in said laser system in contact with a gas in said laser system, whereby selected contamination in the laser system optical cavity gas is absorbed by the selected material in said compartment.

11. A decontaminate apparatus for laser systems in accordance with claim 10 including a plurality of threaded fasteners attaching said compartment to a laser system.

12. A decontaminant apparatus for laser systems in accordance with claim 11 in which said plurality of fasteners are bolts.

13. A decontaminant apparatus for laser systems in accordance with claim 10 in which said compartment has a shock absorbing sheet of material therein attached to the bottom of the cavity beneath the decontaminant material therein to thereby provide cushioning to said decontaminant material.

14. A decontaminant apparatus for laser systems in accordance with claim 10 in which said decontaminant material includes activated charcoal.

15. A decontaminant apparatus for laser systems in accordance with claim 10 in which said decontaminant material includes phosphorus pentoxide.

16. A decontaminant apparatus for laser systems in accordance with claim 10 in which said decontaminant material includes porous silica.

17. A decontaminant apparatus for laser systems in accordance with claim 10 in which said shock absorbing material is porous.

18. A decontaminant apparatus for laser systems in accordance with claim 10 in which said compartment housing is made of aluminum alloy.

* * * * *